Figure 1:
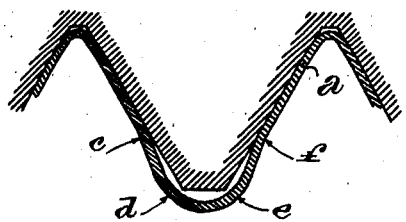

Dec. 6, 1938.   D. T. A. GARNIER   2,138,850
LOCKING MEANS FOR INTERTHREADED ELEMENTS

Filed Dec. 14, 1935

*Inventor:*
DÉSIRÉ THÉODULE ARSÈNE GARNIER
By *Haseltine, Lake & Co.*
*Attorneys.*

Patented Dec. 6, 1938

2,138,850

UNITED STATES PATENT OFFICE 2,138,850

LOCKING MEANS FOR INTERTHREADED ELEMENTS

Désiré Théodule Arsène Garnier, Hautvillers, France

Application December 14, 1935, Serial No. 54,436
In France December 19, 1934

5 Claims. (Cl. 151—14)

This invention relates to safety locking means for interthreading elements, such as a screw or bolt and nut, having for its primary object to improve the connection of the threads when two or more elements are to be assembled and to render it impossible for them to be unlocked accidentally.

The invention also contemplates the production of so-called self-locking nuts or screws.

The principle on which the invention is based is to provide an increase in the friction between the male and female threaded elements by having a slight play between them and interposing between the threads of the two elements and practically taking up the play by an intermediate resiliently, deformable threaded member or bushing produced by any suitable means, the deformation of this member when in position, being in principle, and preferably, cne which does not exceed the elastic limit in order that the deformed parts will retain a sufficient effectiveness even after a number of assembling and disassembling operations.

The connection between the inter-threading elements is ensured in addition to the increase in the friction surface, by the elasticity conserved by this intermediate bushing member.

This deformation producing the increase of friction may affect one or more of the faces of the thread; it may be continuous along the entire height of the thread or limited to one or more points of the section; and it may be applied to the thread over its entire depth or only to one or more portions of this screwthread; or it may be limited to the groove or to the apex of one or more of the threads or even affect the entire profile.

This intermediate bushing member may in the first place be secured to either one or other of the interthreading elements, as for example, on a screw or within a nut, this being effected by any suitable means, such as riveting, soldering, friction or the like. The said member may also be continuous or may be provided with recesses, apertures, slots or the like.

It may have a generating section of practically any form, provided that when in position the connection between the male and female threaded elements does not give rise to any axial play originating from the assembly of the whole, while allowing for normal variations in manufacture, which will not necessarily signify that no space exists, even after the tightening, between the intermediate bushing member and the faces of the male and female threaded elements, for on the contrary there will still be contact on a more or less great portion of the surface between the corresponding male and female elements by means of the resiliently deformable intermediate bushing member.

The invention will in any case readily be understood from the following detailed description and the accompanying diagrammatic drawing, which description and drawing are, of course, given chiefly by way of example showing the invention applied to a V-thread.

Figure 2:
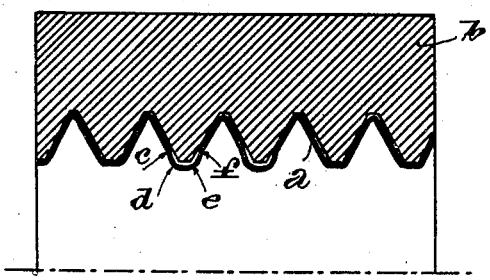
Figure 3:
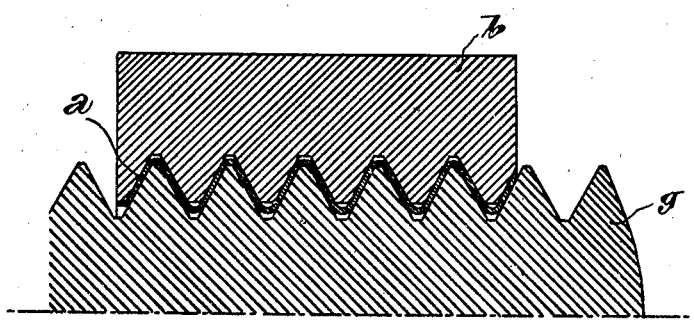

Figure 1 is a detail section, on enlarged scale, of a V-thread provided with the intermediate resiliently deformable bushing member, Figure 2 is a sectional view of a female threaded element (nut) provided with such an intermediate resiliently deformable part before being screwed on a male threaded element (bolt), and Figure 3 is a similar view to the preceding one, but showing the female element in position on the male element.

As will be seen from the drawing, the intermediate bushing member $a$ fits closely over the face of the threads of the nut $b$ with the exception, however, of those parts comprised substantially by the sector $c$, $d$, $e$, $f$, where it projects from the face of the thread.

It will thus be seen that in placing the nut on the male threaded element or bolt $g$ (Figure 2) the faces of the thread of said bolt produce compression or deformation of the parts $c$, $d$ and $e$, $f$ of the intermediate bushing member, forcing them against the threads of the nut, this deformation producing an initial resistance increasing the friction, and also causing the sector $d$ $e$ to project in the direction of the bases of the threads of the bolt, thereby producing a second resistance which results in additional friction, the whole of which makes it impossible for the nut to be loosened.

In order to facilitate initial threading of the nut on the bolt, the first thread or threads need not be covered by this intermediate bushing member, or alternatively said bushing member may fit over at least the greater portion of the faces of the threads without there being any projecting sectors such as $c$, $d$, $e$, $f$, that is to say, said bushing member may have substantially the same profile as the intermediate bushing member assumes after the nut has been fitted on the bolt. The initial threading of the nut on the screw may also be facilitated by any usual means.

This intermediate member is also applicable to any type of thread (square, round or otherwise), irrespective of whether the threads are of normal construction or whether they are subjected, if necessary, to any modification in profile during the locking operation.

This intermediate bushing member is also applicable to all members acting in the manner of a nut and bolt irrespective of the material of which the latter are made, or even more generally to any screwthreaded assembly.

In the example illustrated in the drawing, the intermediate bushing member is illustrated as being originally placed within the thread of the nut, but it will be seen from the foregoing that it may equally well be positioned over the threads of the bolt. In this case, it is the bolt which may comprise the aforesaid means for facilitating the initial inter-threading of the bolt and nut.

The intermediate bushing member could also be constituted by a member cut to the same pitch as the thread of the assembled elements without, however, having projecting parts as shown in the drawings, the resistance required for perfecting the assembly being obtained by deformation of all or part of the threaded portion of this intermediate bushing member which, in the case of a bolt, for example, would be held to a smaller mean diameter if placed within the nut, or to a larger mean diameter if mounted on the screw.

As already intimated, the bushing member is preferably resiliently deformable and may be riveted or soldered in place and is thus of a more or less malleable metal or alloy or other material having analogous characteristics.

Finally, as will be self-evident and as will also be seen from the foregoing, the invention is in no way limited to the constructional forms mentioned above, nor to that of its various parts, but on the contrary it covers all constructional modifications in which use is made of similar arrangements.

What I claim and desire to secure by Letters Patent of the United States is:—

1. In a device for uniting two mutually threaded members adapted to engage with, and having a certain degree of play between each other, such as a nut and a bolt, an elastic bushing the inner and outer walls of which are in the form of threads having the same pitch as said threaded members, which is thin and deformable and interposed between the same in order to increase the frictional resistance between said threaded members by deformation of said elastic bushing member in the course of tightening the contact between the threads and effective to oppose a relative displacement of said threaded members.

2. A device according to claim 1 wherein the elastic bushing member is initially fixed in the threads of the female or nut member.

3. A device according to claim 1, wherein the elastic bushing initially fixed in the threads of the male or bolt member.

4. A device according to claim 1, wherein the elastic bushing member is initially fixed in the threads of one of the two co-operating members including the male and female or bolt and nut members, and provided with a projecting portion around the top of the thread of the respective member to which said tubular member is initially fixed, which projecting portion conforms itself to the portion of the member against which it is engaged and becomes engaged between the threads of the two threaded members and deformed in the bottom of the thread of the other threaded member.

5. A device according to claim 1, wherein the elastic bushing member is initially fixed in the threads of one of the two co-operating members including the male and female or bolt and nut members, and provided with a projecting portion around the top of the thread of the respective member to which said tubular member is initially fixed, which projecting portion conforms itself to the portion of the member against which it is engaged and becomes engaged between the threads of the two threaded members and deformed in the bottom of the thread of the other threaded member to an extent which is within the limit of elasticity of the material of which said elastic bushing member is made.

DÉSIRÉ THÉODULE ARSÈNE GARNIER.